United States Patent
Tokai

(10) Patent No.: US 10,223,428 B2
(45) Date of Patent: Mar. 5, 2019

(54) ASSOCIATION SEARCH SYSTEM, SEARCH HANDLING DEVICE, DATABASE, AND NON-TRANSITORY COMPUTER READABLE MEDIUM

(71) Applicant: FUJI XEROX CO., LTD., Tokyo (JP)

(72) Inventor: Kiwame Tokai, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 775 days.

(21) Appl. No.: 14/656,113

(22) Filed: Mar. 12, 2015

(65) Prior Publication Data

US 2015/0186382 A1    Jul. 2, 2015

Related U.S. Application Data

(63) Continuation of application No. PCT/JP2013/063581, filed on May 15, 2013.

(30) Foreign Application Priority Data

Oct. 5, 2012   (JP) ................................ 2012-223668

(51) Int. Cl.
G06F 17/30       (2006.01)
G06F 21/62       (2013.01)

(52) U.S. Cl.
CPC .... *G06F 17/3053* (2013.01); *G06F 17/30545* (2013.01); *G06F 17/30979* (2013.01); *G06F 21/6218* (2013.01)

(58) Field of Classification Search
USPC ................................................ 707/783, 798
See application file for complete search history.

(56) References Cited

U.S. PATENT DOCUMENTS 5,918,222 A       6/1999  Fukui et al.
7,240,055 B2 *    7/2007  Grasso .............. G06F 17/30867
(Continued)

FOREIGN PATENT DOCUMENTS

JP       8-255150 A      10/1996
JP    2001-175680 A       6/2001
(Continued)

OTHER PUBLICATIONS

Search Report dated Aug. 13, 2013 issued by the International Searching Authority in counterpart International Patent Application No. PCT/JP2013/063581 (PCT/ISA/210).
(Continued)

*Primary Examiner* — Cheyne D Ly
(74) *Attorney, Agent, or Firm* — Sughrue Mion, PLLC

(57) ABSTRACT

When a user inputs a search condition, an agent sends, to a database of each organization to which the user does not have an access right, a search request including the search condition and the ID of a cooperation participant member having an access right to the database of the organization. A proxy of each organization causes the search device to search for a chain of links that connect between a data element that meets the search condition in the search request from the agent and a data element that represents the cooperation participant member in the search request, and returns to the agent information on a cooperation participant member that may have access to the data element that meets the search condition on the basis of the search result.

8 Claims, 14 Drawing Sheets

(56) References Cited

U.S. PATENT DOCUMENTS

| | | | | |
|---|---|---|---|---|
| 7,895,210 B2* | 2/2011 | Bohn | ............... | G06F 17/3066 |
| | | | | 707/741 |
| 8,051,422 B2* | 11/2011 | Narita | ............... | G06F 9/5038 |
| | | | | 707/600 |
| 8,396,855 B2* | 3/2013 | Aggarwal | ............ | G06K 9/6224 |
| | | | | 707/709 |
| 8,799,304 B2* | 8/2014 | Lunt | ............... | G06F 17/30864 |
| | | | | 707/722 |
| 8,856,146 B2* | 10/2014 | Dempski | ............ | G06F 17/30864 |
| | | | | 705/319 |
| 8,949,261 B2* | 2/2015 | Lunt | ............... | G06F 17/30864 |
| | | | | 707/722 |
| 8,990,230 B1* | 3/2015 | Lunt | ............... | G06F 17/30864 |
| | | | | 707/722 |
| 9,165,040 B1* | 10/2015 | Hajaj | ............... | G06F 17/3053 |
| 2011/0137936 A1* | 6/2011 | Miller | ............... | G06F 21/31 |
| | | | | 707/769 |

FOREIGN PATENT DOCUMENTS

| | | |
|---|---|---|
| JP | 2003-316887 A | 11/2003 |
| JP | 2007-26419 A | 2/2007 |
| JP | 2010-224941 A | 10/2010 |

OTHER PUBLICATIONS

Written Opinion dated Aug. 13, 2013 issued by the International Searching Authority in counterpart International Patent Application No. PCT/JP2013/063581 (PCT/ISA/237).

* cited by examiner

FIG. 5

| SUBJECT (NODE) | PREDICATE (LINK) | OBJECT (NODE) |
|---|---|---|
| YOU | BE COLLEAGUE OF | ACQUAINTANCE 1 |
| YOU | PARTICIPATE IN | A CONFERENCE |
| ACQUAINTANCE 1 | BE COLLEAGUE OF | SOMEONE a |
| SOMEONE a | PARTICIPATE IN | B CONFERENCE |
| Psn1 | PARTICIPATE IN | B CONFERENCE |
| Psn1 | PREPARE | Doc1 |
| Psn1 | BELONG TO | ORGANIZATION C |
| SOMEONE b | BELONG TO | ORGANIZATION C |
| SOMEONE b | PARTICIPATE IN | A CONFERENCE |
| YOU | Rdf:type (BE MEMBER OF CLASS OF...) | Foaf:Person (PERSON) |
| ACQUAINTANCE 1 | Rdf:type (BE MEMBER OF CLASS OF...) | Foaf:Person (PERSON) |
| SOMEONE a | Rdf:type (BE MEMBER OF CLASS OF...) | Foaf:Person (PERSON) |
| ⋮ | ⋮ | ⋮ |

FIG. 8

| ARRIVAL FLAG | NUMBER OF HOPS | PATH FROM TERMINAL-POINT NODE |
|---|---|---|
| REACHED | 5 | Doc1, PREPARE, Psn1, PARTICIPATE, B CONFERENCE, PARTICIPATE, SOMEONE a, COLLEAGUE, ACQUAINTANCE 1, COLLEAGUE, YOU |
| REACHED | 5 | Doc1, PREPARE, Psn1, BELONG, ORGANIZATION C, BELONG, SOMEONE b, PARTICIPATE, A CONFERENCE, PARTICIPATE, YOU |
| UNREACHED | 2 | Doc1, COMMENT, Psn2, PARTICIPATE, D CONFERENCE |
| ... | ... | ... |

| USER ID IN COOPERATION SYSTEM | USER NAME | ORGANIZATION USER BELONGS TO | USER ID IN ORGANIZATION USER BELONGS TO |
|---|---|---|---|
| 00001 | A-a | A | 12345678 |
| 00002 | B-b | B | abcde |
| 00003 | C-c | C | ABCDEFG |
| ⋮ | ⋮ | ⋮ | ⋮ |

FIG. 14

| SEARCH RESULT ID | DATA ELEMENT RETRIEVED | REQUESTED ENTITY CANDIDATE | LINK CHAIN (PATH) INFORMATION |
|---|---|---|---|
| 010001 | Doc1 | A-a | (1) Doc1, PREPARE, Psn1, PARTICIPATE, B CONFERENCE, PARTICIPATE, SOMEONE a, COLLEAGUE, ACQUAINTANCE 1, COLLEAGUE, A-a<br>(2) Doc1, PREPARE, Psn1, BELONG, C CONFERENCE, BELONG, SOMEONE b, PARTICIPATE, A CONFERENCE, PARTICIPATE, A-a |
| 010002 | Doc1 | A-b | Doc1, PREPARE, Psn3, PARTICIPATE, A-b |
| 010003 | Doc1 | A-f | Doc1, COMMENT, Psn2, PARTICIPATE, A-f |

ASSOCIATION SEARCH SYSTEM, SEARCH HANDLING DEVICE, DATABASE, AND NON-TRANSITORY COMPUTER READABLE MEDIUM

CROSS REFERENCE TO RELATED APPLICATION

This is a continuation of International Application No. PCT/JP2013/063581 filed on May 15, 2013, and claims priority from Japanese Patent Application No. 2012-223668, filed on Oct. 5, 2012.

BACKGROUND

Technical Field

The present invention relates to an association search system, a search handling device, a database, and a non-transitory computer readable medium.

SUMMARY

An aspect of the present invention provides an association search system including: a plurality of databases with different collections of users having an access right thereto; and a search handling device, in which the search handling device includes a registered user storage section that stores access right information that indicates which of the plurality of databases each registered user has an access right to, the registered user having an access right to at least one of the plurality of databases and being registered in the search handling device, a search request transmitting section that transmits a search request to each of the plurality of databases in response to input of a search condition being received from a user as a search requesting entity, the search request including identification information on the registered user having an access right to the database and the search condition, and a search result providing section that provides the user as the search requesting entity with information on the registered user having a link that is traceable via one or more chains of links to a data element that suits the search condition on a basis of response information from each of the plurality of databases to the search request, and the plurality of databases each includes a graph storage section that stores information on a graph in which data elements are defined as nodes and relationships among the data elements are defined as links, the data elements including a user element that represents a user having an access right to the database, a search request acquiring section that acquires the search request from the search handling device, a data search section that searches the graph storage section for a data element that suits the search condition in the acquired search request, a chain investigating section that investigates the graph storage section for a chain of the links that connect between a node for a data element that suits the search condition retrieved by the data search section and a node for a user element that represents the registered user included in the search request, and a responding section that specifies, among the registered users having an access right to the database, the registered user linked to the node for the data element that suits the search condition through the chain of links on a basis of a result of the investigation performed by the chain investigating section, and responds to the search handling device with response information that represents the specified registered user.

BRIEF DESCRIPTION OF THE DRAWINGS

Exemplary embodiment(s) of the present invention will be described in detail based on the following figures, wherein

FIG. 5 illustrates an example of the content of data in a database;

FIG. 8 illustrates an example of path information obtained by the search processing section;

FIG. 14 illustrates an example of the search result and the link chain investigation result held by a search result holding section in a proxy of an organization;

DETAILED DESCRIPTION

Figure 1A:
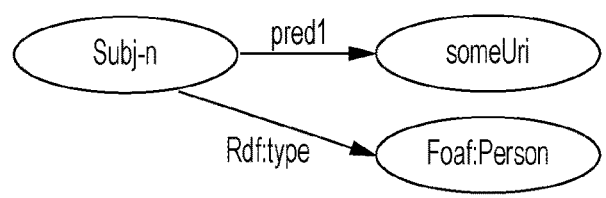
FIG. 1A illustrates a subgraph in which a node having a specific attribute is connected (adjacent) to an in-focus node.

In the following, an example of an association search made by an association search system according to an exemplary embodiment will be described first, and the association search system according to the exemplary embodiment including plural individual search systems that perform the association search will be described thereafter.

Schemes for describing a graph structure determined by the relationship among data elements are known. Examples of such schemes include RDF (Resource Description Framework) which describes the relationship among things (resources, which include both concrete things and abstract concepts) using a set (referred to as "triple") of a subject, a predicate, and an object, for example. The RDF represents a graph in which things such as the subjects and the objects are defined as nodes and the predicates are defined as links (edges) using plural triples. In addition, SPARQL (SPARQL Protocol and RDF Query Language), for example, is known as a computer language for searching for data described using the RDF.

In the exemplary embodiment described below, a search is made through a database containing data that describe the relationship among a variety of things in accordance with the RDF. The method of representing the relationship among things is not limited to the RDF. Thus, the exemplary embodiment described below may also be applied to databases that represent such relationship using schemes other than the RDF.

In order to facilitate understanding of the scheme according to the exemplary embodiment, the following instances are to be considered.

A user A makes a search through a database, and finds a certain electronic document X. However, the user A does not have an access right to the electronic document X, and may not read the content thereof. In such a situation, if one of acquaintances of the user A has an access right to the electronic document X, it is conceivable that the user A asks the acquaintance to inform the user A of the content of the electronic document X. In the case where a person D who is a colleague of a person C who is a colleague of a person B who is a direct acquaintance of the user A has an access right to the document, meanwhile, the user A may contact the person C through the influence of the person B, further contact the person D through the influence of the person C, and ask the person D to inform the user A of the content of the electronic document X.

In the case where a person C who participated in a Y conference participated in by a person B who is a direct acquaintance of the user A has an access right to the electronic document X, the person B may possibly contact the person C by making use of the relationship that both the person C and the person B participated in the same Y conference, although it is unclear whether the person B and the person C are direct acquaintances or colleagues. Consequently, the user A may contact the person C through the influence of the person B, and ask the person C to inform the user A of the content of the electronic document X.

Thus, if chains of relationship via persons that connect between the user A and the electronic document X such as those discussed above are found in a database that describes the relationship among a variety of things including persons and abstract concepts in accordance with the RDF, the user A may possibly access the electronic document X through the influence of persons on the chain path. In the path, things (e.g. the person B) having an attribute of "being a person" and things (e.g. the Y conference participated in by the person C) having a relationship with a thing having an attribute of "being a person" are chained. Data indicating that "C is a person" are expressed by a triple composed of a subject "C", a predicate "have an attribute of (an object)/be a member of a class of (an object)", and an object "a person".

In the exemplary embodiment, a chain path of relationship among things involving a specific attribute is obtained in a database that represents a graph structure composed of a collection of relationships among things. An overview of the method will be described below.

In the case where the user A desires to know chains of "persons" associated with the electronic document A, for example, the user A sets a condition "having an attribute 'person'" on a search device as a narrowing condition for a path search. Examples of the method of setting a condition include presenting a list of attributes (such as "person", "document", "conference", and "organization") stored in the search device to allow the user A to select one from the list. The attributes stored in the search device may belong to the vocabulary of the RDF, or may be defined uniquely in the search device.

In the case where a search is made for a node having an attribute of "person", for example, using the SPARQL, the following search formula may be used:

Select ?p where { ?p rdf:type foaf:Person.}

Here, "rdf:type" means a property indicating that the resource is a member (instance) of a certain class. In addition, "rdf:" represents a namespace of RDF model syntax. The specific specifications of the namespace are summarized in "RDF Vocabulary Description Language 1.0: RDF Schema" as a W3C recommendation (see http://www.w3.org/TR/rdf-schema/).

Similarly, "foaf:Person" is a resource that represents a "person". The description "foaf:Person" complies with "FOAF Vocabulary Specification 0.9" (see http://xmlns.com/foaf/0.1/).

In addition, to search a graph database described in accordance with the RDF for a node having a specific node (hereinafter referred to as "in-focus node") as the object, and when the in-focus node may be described as <someUri>, the following search formula may be used:

Select ?n where { ?n ?pred <someUri> }

If the following search formula obtained by combining the search formulas discussed above is used, for example, a node having the in-focus node as the object and also having a specific attribute "person" (hereinafter represented as "subj-n") is retrieved. The node subj-n is a node that is adjacent to the in-focus node <someUri>.

| <Search Formula 1> |
| --- |
| Select ?subj-n where {<br>?subj-n ?pred1<someUri>.<br>?subj-n rdf:typefoaf:Person.<br>} |

The search formula 1 represents a subgraph composed of nodes and links such as that illustrated in FIG. 1A. In FIG. 1A, the nodes are indicated by ellipses, and the links are indicated by arrows that connect between the ellipses. That is, the subgraph illustrated in FIG. 1A indicates that the node "Subj-n" has a resource specified by <someUri> as the object, and also has an attribute "person" (is of a type=foaf:Person). In the search formula discussed above, the link (predicate) "pred1" is a variable. Consequently, any link matches (suits) "pred1" (that is, the relationship between "subj-n" and <someUri> is not limited). In the search formula discussed above, the node "Subj-n" is a variable, and the node "Subj-n" that matches the subgraph discussed above is the search result.

For example, if the electronic document X is described as a resource <someUri> in the RDF database, a certain resource "Subj-n" meets a condition that the resource has a relationship described by a certain property "pred1" (non-limiting, e.g. "prepare") with the electronic document X, and also is a "person".

In addition, the direction of the relationship is not limited to one direction. If the following search formula 2 is used, for example, a node "subj-n" having the in-focus node as the subject and also having a specific attribute "person" is retrieved:

<Search Formula 2>

```
Select ?subj-n where {
<someUri> ?pred1?subj-n.
?subj-n rdf:typefoaf:Person.
}
```

Figure 1B:
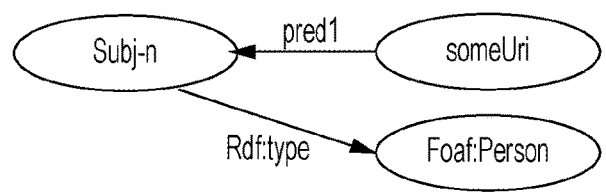
FIG. 1B illustrates a subgraph in which a node having a specific attribute is connected (adjacent) to an in-focus node.

The search formula 2 represents a subgraph illustrated in FIG. 1B. In the case where the resource <someUri> represents the electronic document X and "pred1" is the predicate "uploaded", the node "subj-n" indicates a person who uploaded the electronic document X.

The adjacent node "Subj-n" that is adjacent to the in-focus node (resource) <someUri> retrieved using one of the search formulas 1 and 2 discussed above represents a "person" having some relationship with the in-focus node <someUri>.

Figure 2:
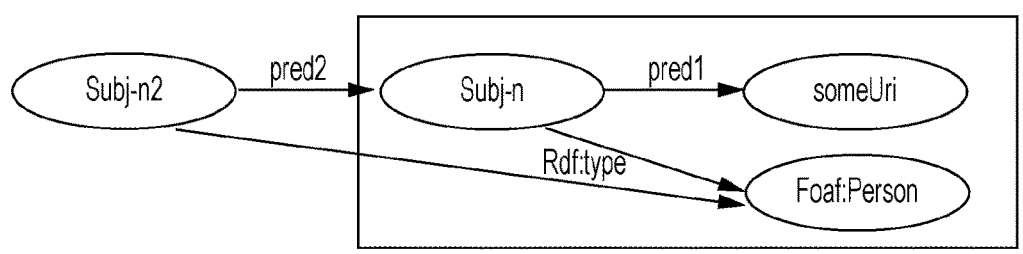
FIG. 2 illustrates a subgraph in which two adjacent nodes having a specific attribute are chained from an in-focus node.

When a search is made using the search formulas 1 and 2 discussed above in this way, similar searches are repeatedly made using the adjacent node "Subj-n", which has been retrieved as meeting one of the search formulas 1 and 2, as the in-focus node <someUri> in subsequent repetitions (iterations). Through such repetitions, a chain of nodes having a specific attribute "person" is generated. For example, a chain of nodes "Subj-n-Subj-n2" obtained through two repetitions is illustrated in FIG. 2. That is, FIG. 2 illustrates a chain composed of a person subj-n having a certain relationship pred1 with the in-focus node <someUri> (e.g. the targeted electronic document X) and a person subj-n2 having a certain relationship pred2 with the person subj-n. Here, the relationship (predicate) pred2 represents a relationship between persons (e.g. "being colleagues"), for example.

In the search formulas 1 and 2 discussed above, it is indicated that the attribute of the adjacent node which is adjacent to the in-focus node is "person". However, the chain may be extended if the attribute of the in-focus node is "person" even if the attribute of the adjacent node is not "person". This corresponds to an example, among the instances mentioned above, in which the person B and the person C who participated in the same Y conference are chained via the Y conference. That is, in the case where the person C (which is determined as the in-focus node) participated in the Y conference (corresponding to an adjacent node that is adjacent to the in-focus node), the Y conference is incorporated into the chain as the node next to the person C. Then, when the Y conference is determined as the in-focus node, the person B which is an adjacent node matches the search formula 1 discussed above, and is incorporated into the chain.

Thus, as search formulas for inspecting an adjacent node for a case where the attribute of the in-focus node is "person", the following search formulas 3 and 4 (which correspond in direction to the search formulas 1 and 2, respectively) may be used:

<Search Formula 3>

```
Select ?subj-n where {
?subj-n ?pred1<someUri>.
<someUri>rdf:type foaf:Person.
}
```

<Search Formula 4>

```
Select ?subj-n where {
<someUri> ?pred1?subj-n.
<someUri>rdf:type foaf:Person.
}
```

In this way, by repeatedly performing steps of (a) searching for an adjacent node subj-n that is adjacent to the in-focus node <someUri> and that meets one of the search formulas 1 to 4 and (b) determining the retrieved adjacent node as the in-focus node in the next repetition, a chain of nodes related to the first designated in-focus node is prepared.

Then, in the exemplary embodiment, such a chain of nodes is presented as the search result together with how the nodes are related (linked).

Figure 3:
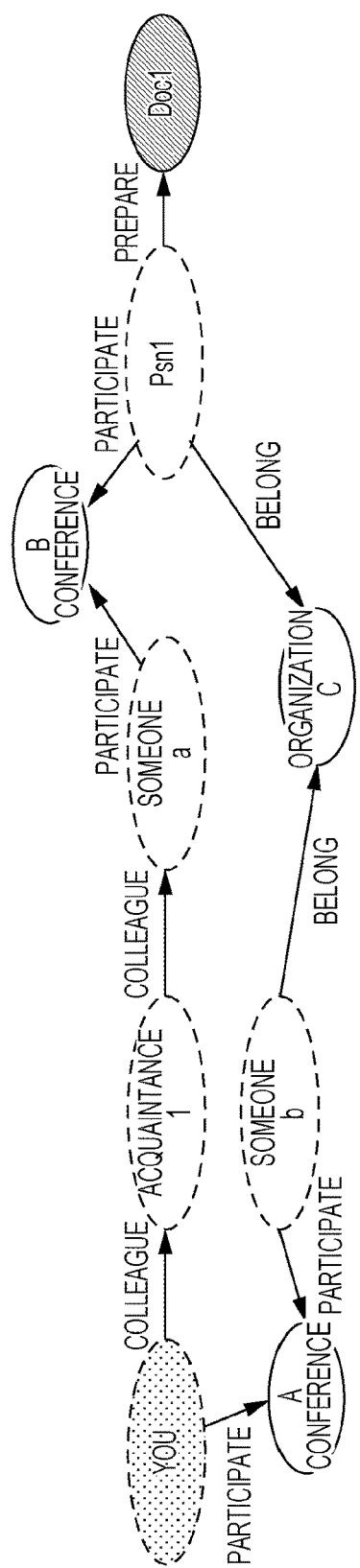
FIG. 3 illustrates an example of a chain path of relationship via nodes having a specific attribute ("person") from a start-point node to a terminal-point node.

FIG. 3 illustrates an example with two chains of things via persons that extend from a person "you" to a document "Doc1" obtained by making such searches on a certain graph database. In FIG. 3, nodes having an attribute "person" are indicated by broken ellipses, and nodes not having an attribute "person" are indicated by solid ellipses.

<Chain 1>

The person "you" who is a 'colleague' of a person "acquaintance 1"→the person "acquaintance 1" who is a 'colleague' of a person "someone a"→the person "someone a" who 'participated' in a conference "B conference"→the conference "conference B" 'participated' in by a person "Psn1"→the person "Psn1" who 'prepared' the document "Doc1"

<Chain 2>

The person "you" who 'participated' in a conference "conference A"→the conference "conference A" 'participated' in by a person "someone b"→the person "someone b" who 'belongs' to an organization "organization C"→the organization "organization C" 'belonged' to by a person "Psn1"→the person "Psn1" who 'prepared' the document "Doc1"

The search device according to the exemplary embodiment presents information on such chain paths to the user "you" who instructed the search. That is, chains for a group of adjacent nodes are output as series of information on nodes and links and connection information between the nodes. When FIG. 3 is taken as an example, for the information on nodes and links, "you" and "acquaintance" correspond to the nodes, and "colleague" corresponds to the links. For the connection information between the nodes, connection between "you" and "acquaintance" through a relationship "colleague" is indicated by an arrow.

The scheme according to the exemplary embodiment has been roughly described above. Next, an example of the configuration and the process procedure of the search device which implements the scheme will be described.

Figure 4:
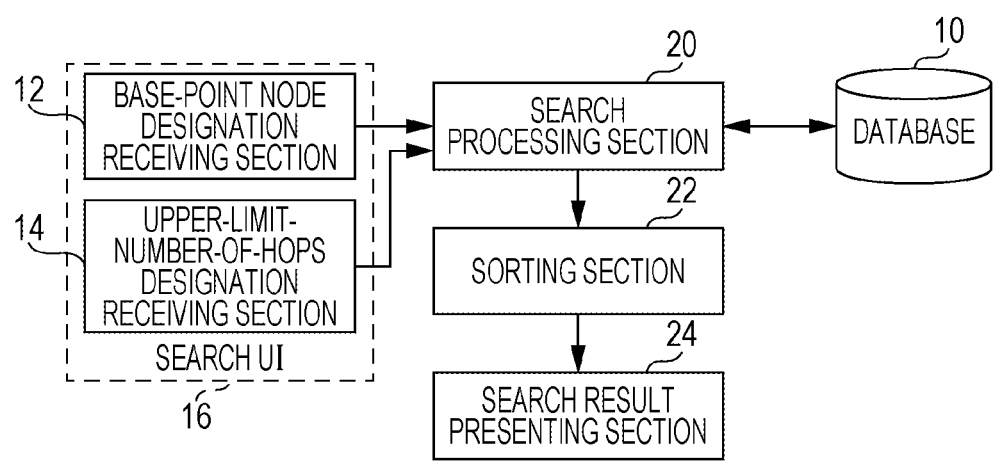
FIG. 4 is a functional block diagram of an example of a search device according to an exemplary embodiment.

FIG. 4 illustrates an example of the configuration of the search device according to the exemplary embodiment.

In the configuration of FIG. 4, a database 10 stores graph data that represent a graph structure constituted by the relationship among data elements. Here, the relationship among the data elements is expressed using the RDF. However, the search scheme according to the exemplary embodiment may also be applied to a case where the relationship among the data elements is expressed using a scheme other than the RDF.

FIG. 5 illustrates an example of the graph data stored in the database 10. The data illustrated in FIG. 5 contain plural "triples", which are each a set of a subject, a predicate, and an object. The graph data illustrated in FIG. 5 represent the graph illustrated in FIG. 3. It should be noted, however, that the data format illustrated in FIG. 5 is merely exemplary, and any data format other than that illustrated in FIG. 5 that may describe the relationship among the data elements may also be used.

Returning to the description of FIG. 4, the database 10 may be mounted to a computer provided with a function for a graph search such as a search processing section 20 or the like to be described later, or may be mounted to another computer connected to the above computer via a network such as the Internet.

A base-point node designation receiving section 12 receives designation of base-point nodes from the user as one of items to be designated for a search. The base-point nodes are nodes at end points of a chain path that the user desires to obtain through a search. In the example of FIG. 3, the start-point node "you" and the terminal-point node "Doc1" of the path correspond to the base-point nodes. In the case where the user is caused to designate the start point and the terminal point, the terminal point corresponds to the thing targeted by the user, and the start point corresponds to the thing (typically, the user himself/herself) desired to be chained to the terminal point. Instead of causing the user to designate two nodes, namely the start-point node and the terminal-point node, as the base-point nodes, the user may be caused to designate only one base-point node. For example, in the case where it is desired to know a thing associated with the document "Doc1" via persons, the user may be caused to designate only one node, namely the document "Doc1", as the base-point node.

An upper-limit-number-of-hops designation receiving section 14 receives from the user designation of the upper limit number of hops (that is, the number of links) that represents the search range from the base-point node.

The base-point node designation receiving section 12 and the upper-limit-number-of-hops designation receiving section 14 constitute a search UI (user interface) 16 that receives input of a search condition for the search device. Designation of the upper limit number of hops that represents the search range is not essential. In the case where designation of the upper limit number of hops is not required, the search UI 16 may not include the upper-limit-number-of-hops designation receiving section 14.

The search processing section 20 executes the search procedure roughly described above to search for a chain path of relationship via nodes having a specific attribute (e.g. "person") for the base-point node input by the user via the search UI 16. Which one of a variety of attributes is determined as the "specific attribute" may be set in the search processing section 20 in a fixed manner, or may be selected by the user in the manner discussed above. In the case where the user is caused to select the "specific attribute", the search UI 16 may be provided with a UI for attribute selection. In the case where the user is caused to select the "specific attribute", the object of the predicate rdf:type in the search formulas 1 to 4 used in a search may have a value that represents the selected attribute. A sorting section 22 sorts (determines the order of) one or more chain paths retrieved by the search processing section 20 in accordance with a criterion determined in advance. Examples of the criterion for sorting are considered to include the number of hops in the chain path in the ascending order.

A search result presenting section 24 executes a process for presenting (i.e. displaying) the result of sorting performed by the sorting section 22 to the user. The search result presenting section 24 may display a sorted list of the one or more retrieved chain paths, for example. It should be noted, however, that this is merely exemplary, and the manner of presenting the sorting result is not specifically limited.

Next, an example of a process procedure performed by the search processing section 20 will be described with reference to FIGS. 6 and 7. In the example, the user designates two nodes, namely the start-point node and the terminal-point node, as the base-point nodes.

Figure 6:
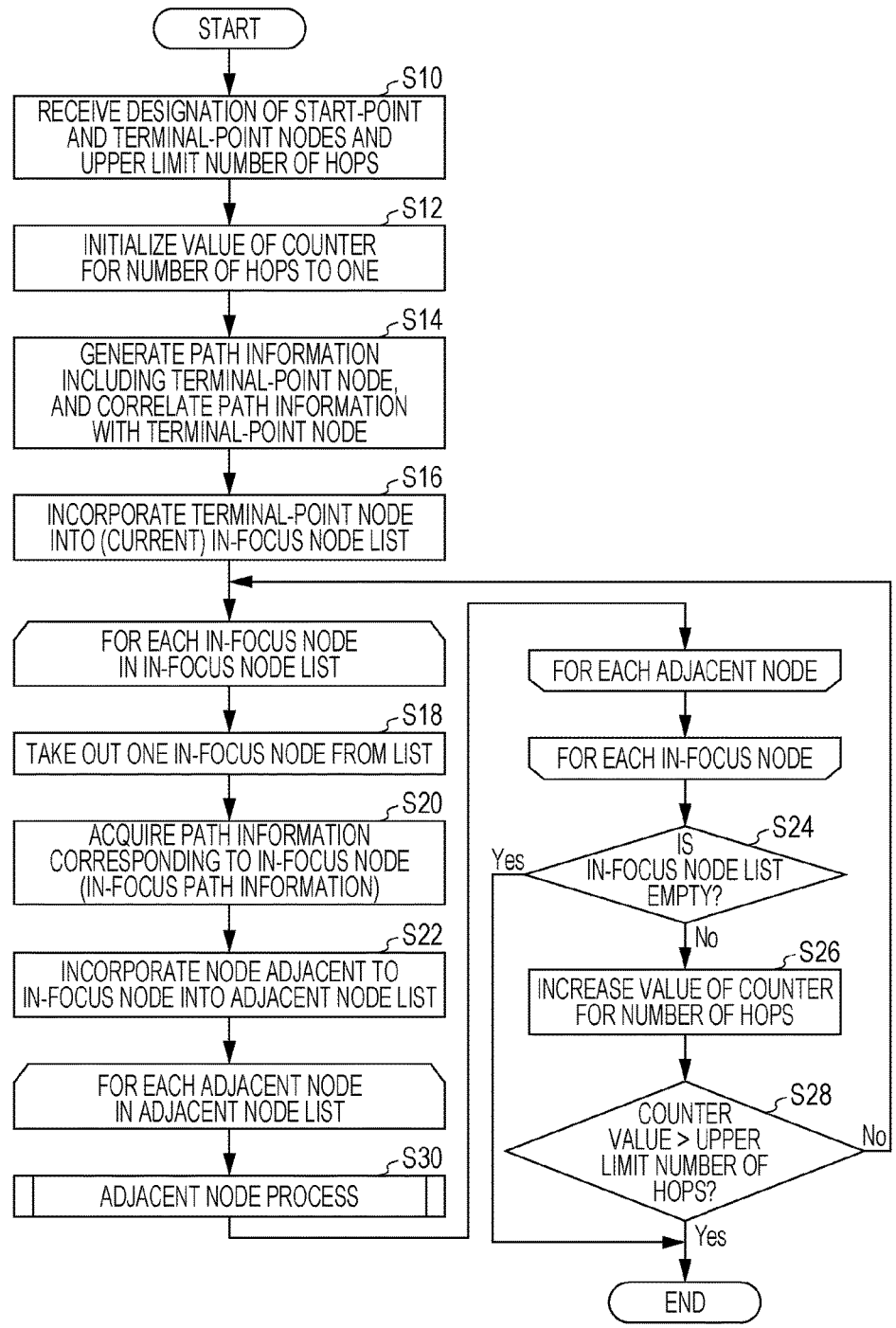
FIG. 6 is a flowchart illustrating an example of an overall process procedure performed by a search processing section.

In the procedure, as illustrated in FIG. 6, the base-point node designation receiving section 12 of the search UI 16 first receives designation of a node as the start point and a node as the terminal point, among the nodes in the graph, from the user, and the upper-limit-number-of-hops designation receiving section 14 receives designation of the upper limit number of hops from the user (S10). When such designations are received, the search processing section 20 initializes the value of a counter that represents the number of hops to one (S12).

Next, the search processing section 20 prepares path information including the node designated as the terminal point and stores the prepared path information in correlation with the terminal-point node (S14), and incorporates the terminal-point node into a list of in-focus nodes (in-focus node list) for a number of hops of one (S16) (that is, the terminal-point node is determined as the first in-focus node).

Here, the path information is a line of information in which nodes that belong to a chain path desired to be obtained are arranged in the order of arrangement of such nodes on the chain path. The path information may also include information on links on the chain path.

Figure 7:
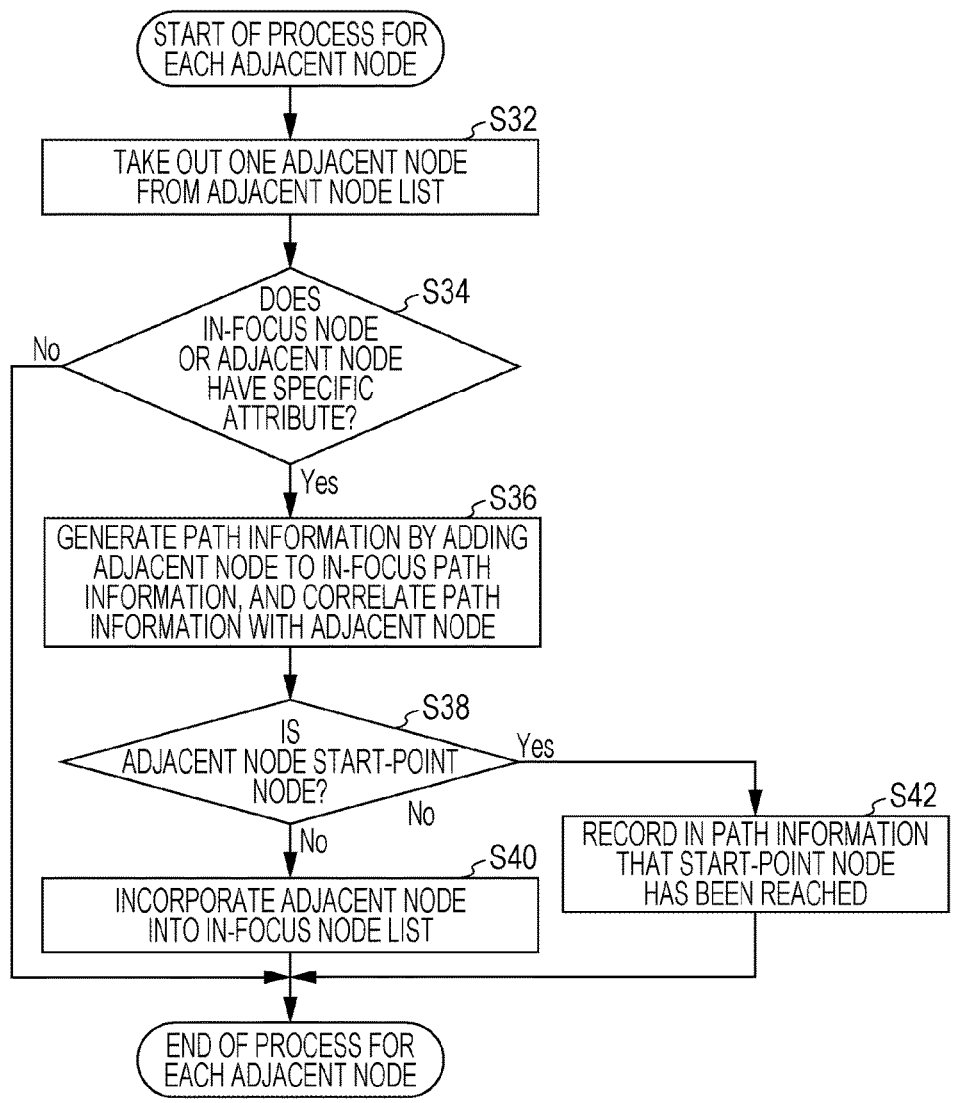
FIG. 7 is a flowchart illustrating an example of a procedure of an adjacent node process performed by the search processing section.

In the procedure of FIGS. 6 and 7, an investigation for a chain path is started from the terminal-point node, and each time an adjacent node that matches a condition (i.e. meets one of the search formulas 1 to 4 discussed above) is obtained, the adjacent node is added to the path information. In the course of the investigation, the chain path may be divided into branches. In such a case, path information is added to each of the branches.

The investigation is started from the terminal-point node as described above because a chain path linked to the terminal-point node targeted by the user may be presented by performing an investigation for a chain path from the terminal-point node even if a path chained to the start-point node is not found. With reference to the example of FIG. 3, even if a chain path of relationship via persons starting from the targeted document "Doc1" does not reach the person "you" as the starting point, presentation of such a chain path is meaningful, because you may be possibly acquainted with any "person" that is present on the chain path (although the fact of such acquaintance is not registered in the graph data).

Next, the search processing section 20 repeatedly performs the processes in S18 to S30 for each of the nodes in the current in-focus node list. At the present time, in the context of the description that has been made so far, the current (i.e. number of hops=1) in-focus node list only includes the terminal-point node. Thus, the processes in S18 to S30 are first executed with the terminal-point node determined as the in-focus node.

In the process for the individual in-focus nodes in the current in-focus node list, the search processing section 20 first takes out one unprocessed in-focus node from the in-focus node list (S18), and acquires the path information stored in correlation with the in-focus node (S20). Next, the search processing section 20 extracts from the graph all the nodes that are adjacent via a link (i.e. connected via one link) to the in-focus node (excluding the nodes included in the path information acquired in S20), and incorporates the extracted nodes (which are called adjacent nodes that are adjacent to the in-focus node) into an adjacent node list (S22). Then, the search processing section 20 repeatedly performs an adjacent node process (S30) for each of the adjacent nodes in the adjacent node list.

An example of a detailed procedure of the adjacent node process (S30) is illustrated in FIG. 7. In the process for the individual adjacent nodes, the search processing section 20 first takes out one unprocessed adjacent node from the adjacent node list (S32). Then, it is determined whether or not the adjacent node which has been taken out or the in-focus node has a specific attribute (in the example of FIG. 3 etc., "person") (S34). In the processes in S22, S32, and S34, the search formulas 1 to 4 discussed above are executed with the in-focus node set to <someUri>. In the case where the result of the determination performed in S34 is Yes, new path information is generated by adding the adjacent node to the tail end of the line of nodes in the path information (corresponding to the in-focus node) acquired in S20, and the generated path information is stored in correlation with the adjacent node (S36). The value of the counter for the current number of hops is included in the newly generated path information. The counter value indicates the distance (number of hops) from the terminal-point node of the path information. In the case where links are also recorded in the path information, information on the links that connect between the in-focus node and the adjacent node is also included in the newly generated path information. Next, the search processing section 20 determines whether or not the adjacent node coincides with the start-point node designated in S10 (S38). If the adjacent node does not coincide with the start-point node, the adjacent node is incorporated into an in-focus node list for the next number of hops (that is next to the current number of hops as seen from the terminal-point node), and the process is terminated (S40). If the adjacent node coincides with the start-point node, information indicating that "the start-point node has been reached" is recorded in the path information stored in correlation with the adjacent node, and the process is terminated (S42). The path information corresponding to the in-focus node may be deleted when the processes in S32 to S42 are finished for all the adjacent nodes that are adjacent to the in-focus node.

Through the adjacent node process (S30) described above, in the case where the condition that one of the in-focus node and the adjacent node has a specific attribute (e.g. "person") is met, the adjacent node is added to the chain path extending from the terminal-point node to the in-focus node. In the case where there are plural adjacent nodes that meet the condition, a number of new chain paths (path information) are generated, the number being the same as the number of the adjacent nodes.

Returning to FIG. 6, when the processes in S18 to S30 are finished for all the nodes in the current in-focus node list, the search processing section 20 checks whether or not an in-focus node list for the next number of hops is empty (S24). If not, the value of the counter for the number of hops is increased by one (S26). Then, it is determined whether or not the counter value has exceeded the upper limit number of hops designated in S10 (S28). If not, the processes in S18 to S30 are repeatedly performed for an in-focus node list for the number of hops indicated by the counter. If the counter value has exceeded the upper limit number of hops, the process is terminated by discontinuing the investigation. Also in the case where it is found in S24 that the in-focus node list for the next number of hops is empty (i.e. the chain via nodes with a specific attribute is disconnected), the process is terminated by discontinuing the investigation.

Through the processes illustrated in FIGS. 6 and 7, several pieces of path information on a chain path of relationship via nodes with a specific attribute extending from the terminal-point node are prepared. An example of such path information is illustrated in FIG. 8. In the table illustrated in FIG. 8, each row corresponds to each piece of path information. The individual pieces of path information include information on an arrival flag, the number of hops, and the path from the terminal-point node. The arrival flag indicates whether or not the chain path reaches the start-point node. The arrival flag is set to "reached" in S42 (FIG. 7). The arrival flag is otherwise "unreached" (not reached). The number of hops indicates the number of hops in the chain path. The path from the terminal-point node is the list of nodes added in S14 and S36 (and links from the in-focus node to the node). The example in FIG. 8 corresponds to the graph illustrated in FIG. 3. The first piece of path information indicates a chain that starts at the terminal-point node "Doc1", followed by a link "prepare", a node "Psn1" with an attribute "person", a link "participate" in the opposite direction (in FIG. 8, an underline drawn under the name of a link indicates the opposite direction with the direction toward the terminal point defined as the forward direction), a node "B conference", . . . , and that extends to the start-point node "you". The path information reaches the start point, and thus the value of the arrival flag is "reached". The path information in the third row of FIG. 8 corresponds to an example of a chain that does not reach the start point, although such an example is not illustrated in FIG. 3.

Figure 9:
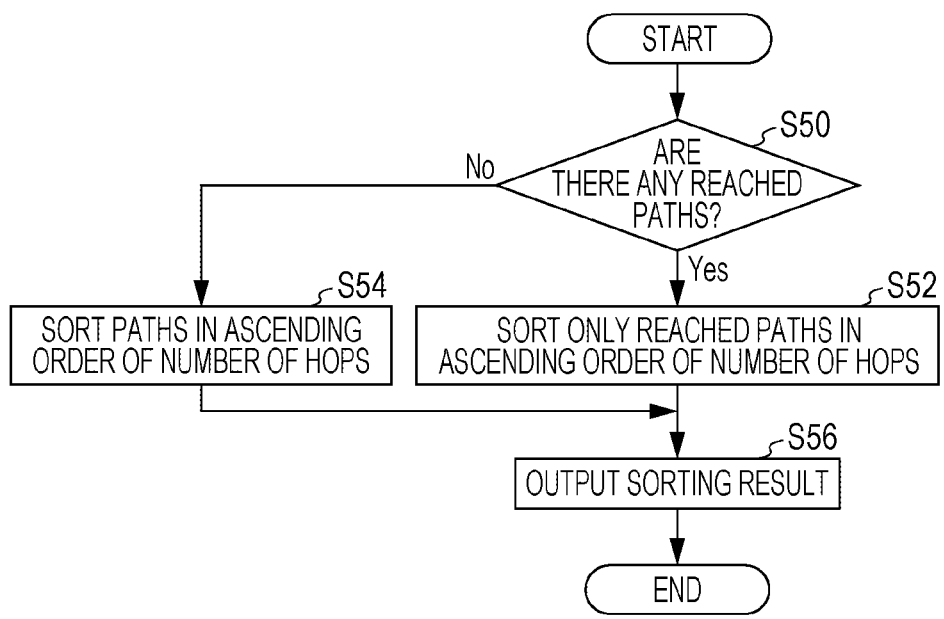
FIG. 9 is a flowchart illustrating an example of a process procedure performed by a sorting section.

Next, an example of a process procedure performed by the sorting section 22 will be described with reference to FIG. 9. The sorting section 22 performs the process of FIG. 9 on the group of path information (see FIG. 8) generated by the search processing section 20 through the processes illustrated in FIGS. 6 and 7. In the process, the sorting section 22 checks whether or not there are any pieces of path information with the arrival flag "reached" (S50), and if there are one or more pieces of path information with the arrival flag "reached", sorts only the pieces of path information with the arrival flag "reached" in the ascending order of the number of hops (S52). That is, a chain path with a smaller number of hops is ranked higher (i.e. given higher importance). This is because it is highly likely that the target (document "Doc1") may be accessed with less effort as the number of intermediate persons is smaller. Only the pieces of path information with the arrival flag "reached" are sorted because a chain path with the arrival flag "unreached" is valueless if there is a chain path with the arrival flag "reached". If the result of the determination performed in S50 is No, that is, if the path information obtained by the search processing section 20 includes only pieces of with the arrival flag "unreached", the pieces of path information with the arrival flag "unreached" are sorted in the ascending order of the number of hops (S54). Then, the result of the sorting performed in S52 or S54 is output to the search result presenting section 24 (S56). The search result presenting section 24 displays the sorted chain paths.

An example of the process procedure performed by the device according to the exemplary embodiment has been described above. In the example described above, the investigation is performed from the terminal-point node. However, the present invention is not limited thereto, and the investigation may be performed from the start-point node.

The procedure of FIGS. 6 and 7 described above corresponds to an example of a case where designation of two base-point nodes, namely the start point and the terminal point, is received from the user. In the case where designation of only one base-point node is received from the user, the procedure of FIG. 6 may be modified such that designation of one base-point node is received in S10, and the procedure of FIG. 7 may be modified such that S38 and S42 are omitted.

In the example discussed above, in the case where one of the in-focus node and the adjacent node has a specific attribute, the adjacent node is incorporated into the chain path irrespective of the type of the link between the two nodes. However, this is merely exemplary. Instead, the adjacent node may not be incorporated into the chain path unless the link between the two nodes corresponds to one of several types determined in advance even in such a case. For example, in the example of FIG. 3, in the case where at least one of the in-focus node and the adjacent node has a specific attribute "person", the adjacent node may be incorporated into the chain path, for example, only in the case where the type of the link (predicate) between the in-focus node and the adjacent node is one of "be a colleague of", "participate in", and "belong to". The links such as "be a colleague of", "participate in", and "belong to" indicate relationship that connects between persons, and therefore the chain path is extended only for such links. It should be noted, however, that a case where the terminal-point node does not have a specific attribute ("person") is an exception (the terminal-point node "Doc1" in FIG. 3 is one such exception), and an adjacent node that is adjacent to the terminal-point node and that has a specific attribute ("person") may be incorporated into the chain path.

In the example described above, in the case where the in-focus node has a specific attribute (e.g. "person"), a node that is adjacent to the in-focus node is unconditionally added to the chain path. Instead, the adjacent node may not be incorporated into the chain path unless the adjacent node does not meet another condition even in such a case. Examples of the condition to be imposed include a condition that the adjacent node corresponds to one of a group of attributes.

In the example of FIG. 3, for example, "B conference", "organization C", and "Doc1" are provided as nodes that are adjacent to the node "Psn1" having an attribute "person". It is assumed that the person "Psn1" has "prepared" a document (called "Doc2", for example) other than the document "Doc1". In this case, when "Psn1" is determined as the in-focus node after an investigation is started from the terminal-point node "Doc1", "B conference", "organization C", and "Doc2" are provided as nodes that are adjacent to the in-focus node (excluding the immediately preceding in-focus node "Doc1"). Such nodes do not have a specific attribute "person", but the in-focus node "Psn1" has an attribute "person". Thus, in the procedure of FIG. 7 discussed above, the three nodes are incorporated into the chain path. In contrast, in the case where the in-focus node has a specific attribute, a condition that only an adjacent node that has an attribute "person", "conference", or "organization" is incorporated into the chain path may be imposed. It is highly likely that a node corresponding to a gathering of persons such as "conference" and "organization" mediates persons (e.g. participants in a conference are acquainted with each other in the conference). Therefore, in the case where the relationship via "person" is to be traced, it is highly likely that the human relationship is traceable even if a node having an attribute such as "conference" is interposed. If a document "Doc2" "prepared" by a person "Psn1" is "viewed" by another person "Psn2", in contrast, it is not highly likely that the persons "Psn1" and "Psn2" are acquainted with each other. Thus, in some cases, incorporation of a non-"person" node into the chain path is desirably limited to only a case where such a node has an attribute (such as "conference" and "organization") that indicates a thing that mediates human relationship. In such a case, "Doc2" having an attribute "document" is not incorporated into the chain path.

In the example described above, the specific attribute as a condition for a chain is "person". However, another attribute may be used as the specific attribute.

In the example described above, the user designates one or two base-point nodes as a search condition through the search UI 16 of the search device of FIG. 4. However, this is merely exemplary. Instead, the user may designate, as a search condition, a condition related to the attribute that a data element to be determined as a base-point node should have (e.g. the value of an attribute or the range of the value, the values of plural attributes or a combination of the ranges of the values, or the like). In this case, the search processing section 20 searches the database 10 for a data element having an attribute that matches the search condition, determines the retrieved data element as a base-point node, and investigates for a chain of links connected to the base-point node as discussed above. In this event, for example, a node corresponding to the user who made the search request may be determined as one base-point node by default, and a search may be made for a chain of links between the base-point node and a node (i.e. the other base-point node) for a data element retrieved in accordance with the search condition related to the attribute.

An example of the association search scheme used in the exemplary embodiment and an example of the individual search device (see FIG. 4) which implements the association search scheme have been described above. Next, an example of an association search system according to the exemplary embodiment that includes plural such search devices will be described.

Figure 10:
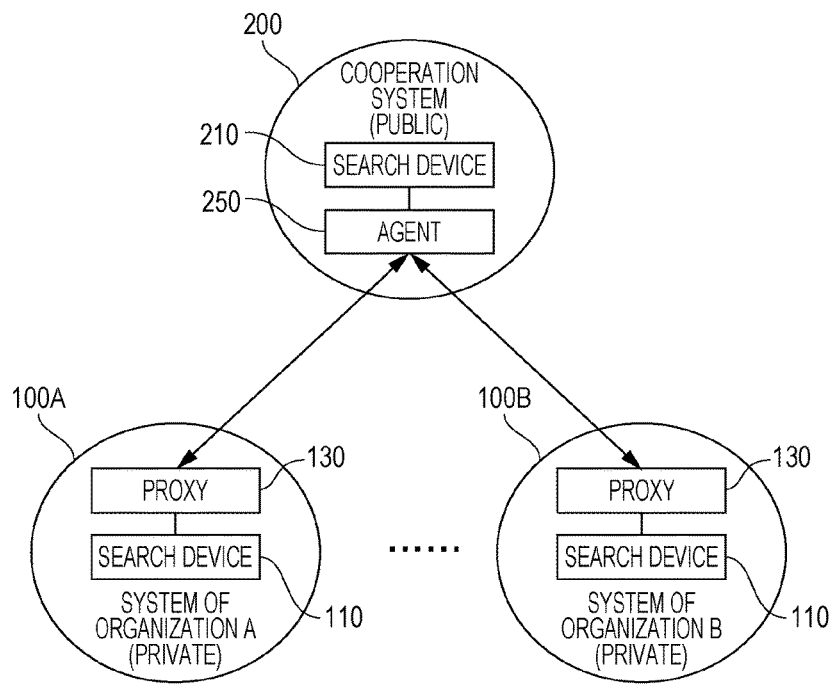
FIG. 10 illustrates an overview of an association search system according to the exemplary embodiment.

FIG. 10 illustrates the configuration of an example of the association search system according to the exemplary embodiment. In the example, each of plural organizations A, B, . . . includes the search device illustrated in FIG. 4 (indicated as "search device 110" in FIG. 10) provided in systems 100A, 100B, . . . (hereinafter referred to collectively as "systems 100" in the case where it is not necessary to distinguish them) in the network of the organization. The individual organizations A, B, . . . are social systems composed of plural persons such as corporations, public offices, and groups. Members of each organization have an access right to the system 100 (and the search device 110 provided therein) of the organization to which they belong, and receive services such as searching by accessing the system 100 of the organization.

Here, a case where the individual organizations A, B, . . . cooperate (collaborate) with each other for a certain business, for example, is considered. In some cases, all of the constituents of the organizations A, B, . . . participate in the cooperation. In other cases, some of the constituents of the organizations A, B, . . . participate in the cooperation. In some cases, the cooperation members actually gather to proceed with the cooperation. In other cases, the cooperation members virtually gather and exchange information on an information system to proceed with the cooperation. A cooperation system 200 is constructed to assist and manage the cooperation by providing a virtual space, an information exchange function, an information accumulation and reuse function, and so forth, for example. The system 200 may be provided with a search device 210 that is equivalent in function to that illustrated in FIG. 4.

A member who participates in the cooperation searches the cooperation system 200 for necessary information. However, the necessary information is not necessarily present in the system 200, and may be present the systems 100A, 100B, . . . in the individual organizations A, B, . . . which participate in the cooperation. Here, the member who makes the search has an access right to the system 100 of the organization to which he/she belongs and thus may search for information in the system, but does not have an access right to the systems 100 of the other organizations and thus may not search for information in the systems. Thus, the cooperation system 200 is provided with an agent 250 that makes a search request for the systems 100 of the organizations on behalf of the member. The systems 100 of the organizations provide an access right to the agent 250. Consequently, the agent 250 becomes able to access the systems 100 of the organizations to make a search request.

It should be noted, however, that the agent 250 does not make a search by directly accessing the search devices 110 in the systems 100 of the organizations. In order to protect the security of the systems 100, each system 100 is provided with a corresponding proxy 130, and the agent 250 sends a search request to the proxy 130. The proxy 130 relays the search request to the search device 110, and receives the result of a search executed by the search device 110 in response to the search request.

In a typical example, the agent 250 sends to the proxy 130 of the organization to which the cooperation member belongs a search request including information that specifies the member and the search condition. In the case where plural persons from one organization participate in the cooperation, the search request may include information that specifies the plural members and the search condition. In response to the search request, the search device 110 of the organization searches for a data element that meets the search condition, and further searches for a chain of links that connect between the retrieved data element and the member, and replies to the proxy 130 with the obtained chain.

The search result (information on the chain of links) obtained by the search device 110 is internal information of the organization, and it is often not desirable to provide all such information to the agent 250 in terms of security. Thus, the proxy 130 extracts only information that may be provided to the outside of the system 100 (in this case, the cooperation system 200) from the search result, and replies to the agent 250 with the extracted information. In the example, the proxy 130 replies to the agent 250 with a response that indicates who among the cooperation participant members is linked to the data element corresponding to the search condition through a chain of links. Information on who participates in the cooperation from the organization has been known to the cooperation system 200. In the example, in addition, the data element itself that matches the search condition and internal information such as the chain of links between the participant member and the data element are not provided to the outside of the organization. Thus, information security in the organization is protected.

The agent 250 collects and organizes the responses from the proxies 130 of the plural organizations A, B, . . . , and provides the result as the search result to the user as the search requesting entity. The user may reference the search result to find which of the cooperation participant members to contact in order to possibly obtain information that matches the search condition. Both the user as the search requesting entity and the member indicated in the search result participate in the cooperation, and are highly likely to know each other. The user as the search requesting entity contacts the member indicated in the search result by electronic mail, telephone, or the like to request the member to obtain information on the search target.

Here, the request for obtainment may be received by the agent 250, and the corresponding member may be notified of the request via the proxy 130 of the corresponding organization. In this case, the proxy 130 may store a search result obtained by the search device 110 for a search request, and in the case where an obtainment request is received from the agent 250, present to the member as the requested entity the search result, that is, information on a chain of links between the member and a data element (e.g. a document file) that matches the search condition in the search request. The member as the obtainment requested entity references the presented information to grasp his/her relationship with the data element, and determines whether or not he/she may actually obtain the data element and whether or not the data element is information that may be provided to the outside (a person from another organization that participates in the cooperation). Then, in the case where it is finally determined that the data element may be obtained and provided to the outside, the member as the requested entity uploads the data element to the cooperation system 200 by way of the proxy 130, and provides the data element to the user as the search requesting entity.

An overview of the association search system according to the exemplary embodiment has been described above. Next, a detailed example of the system will be described.

Figure 11:
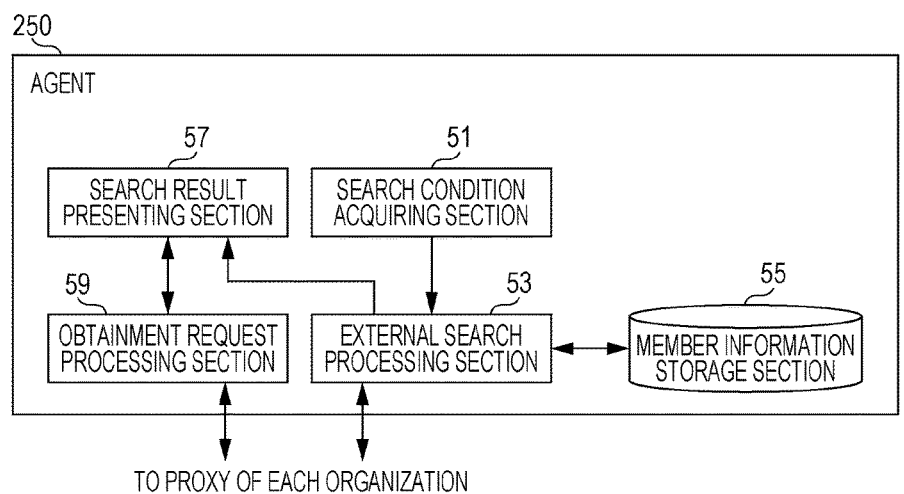
FIG. 11 illustrates an example of the functional configuration of an agent of a cooperation system.

FIG. 11 illustrates an example of the functional configuration of the agent 250 of the cooperation system 200. The illustrated agent 250 includes a search condition acquiring section 51, an external search processing section 53, a member information storage section 55, a search result presenting section 57, and an obtainment request processing section 59.

The search condition acquiring section 51 acquires a search condition input by the user to the search device 210 in the cooperation system 200. The user as the search requesting entity is a cooperation member, and has an access right to the system 200. The input search condition is a condition that specifies the attribute of the data element desired to be retrieved. For example, in the case where the data element desired to be retrieved is a document file, the search condition may be the file name of the document file, the title of the document, a keyword added to the document, or the like. For example, the user as the search requesting entity accesses a web page for a search provided by the search device 210, and inputs a search condition to the web page to command a search. When the user as the search requesting entity inputs a search condition to the search device 210 of the cooperation system 200, the search condition is delivered to the agent 250 to request the agent 250 to issue a search request for the systems 100 of the organizations.

Here, the search device 210 may execute a search corresponding to a search condition through of database 10 (see FIG. 4) of the search device 210 itself. Through the search executed by the search device 210 in this event, for example, a data element that suits the search condition is obtained from the database 10 of the search device 210 itself, and a chain of links that connect between the obtained data element and the user as the search requesting entity is obtained from a graph that indicates the state of links among the data elements stored in the database 10. As a matter of course, there is a case where no chain of links that connect between the data element and the user is present. In such a case, no such chain may be retrieved. In the case where the cooperation system 200 does not include the search device 210, the agent 250 may receive input of a search condition from a cooperation member.

The search condition acquiring section 51 delivers the acquired search condition to the external search processing section 53. The external search processing section 53 sends a search request including the search condition to the proxies 130 of the organizations. Information on the proxies 130 that is necessary for communication such as the IP addresses of the proxies 130 has been registered in advance in the agent 250.

Here, the search request addressed to the proxies 130 of each organization includes information that specifies a member who participates in the cooperation among the members of the organization 100. For example, a search request including identification information on a person who belongs to the organization 100A, among the cooperation participant members, and a search condition is sent to the organization 100A.

In order to issue such a search request, the external search processing section 53 references the member information storage section 55. The member information storage section 55 stores information on members registered in the cooperation system 200, in particular information that indicates which organization each member comes from.

Figures 12, 13:
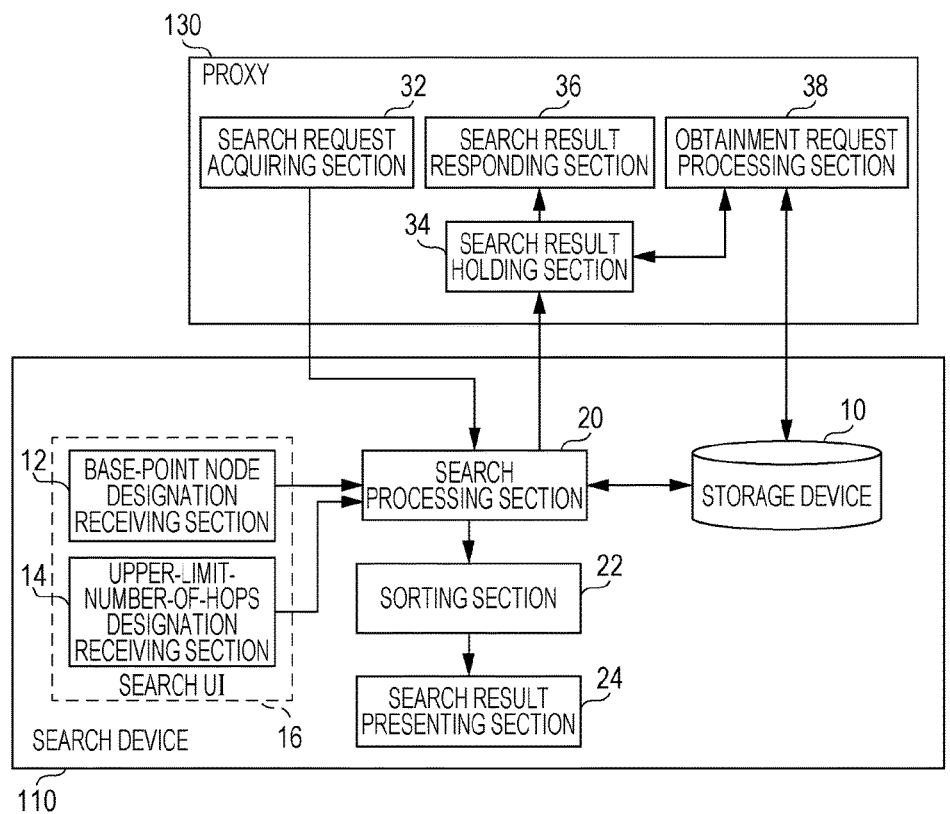
FIG. 12 illustrates an example of the content of data stored in a member information storage section of the agent.
FIG. 13 illustrates an example of the functional configuration of a system of each organization.
Figure 15:
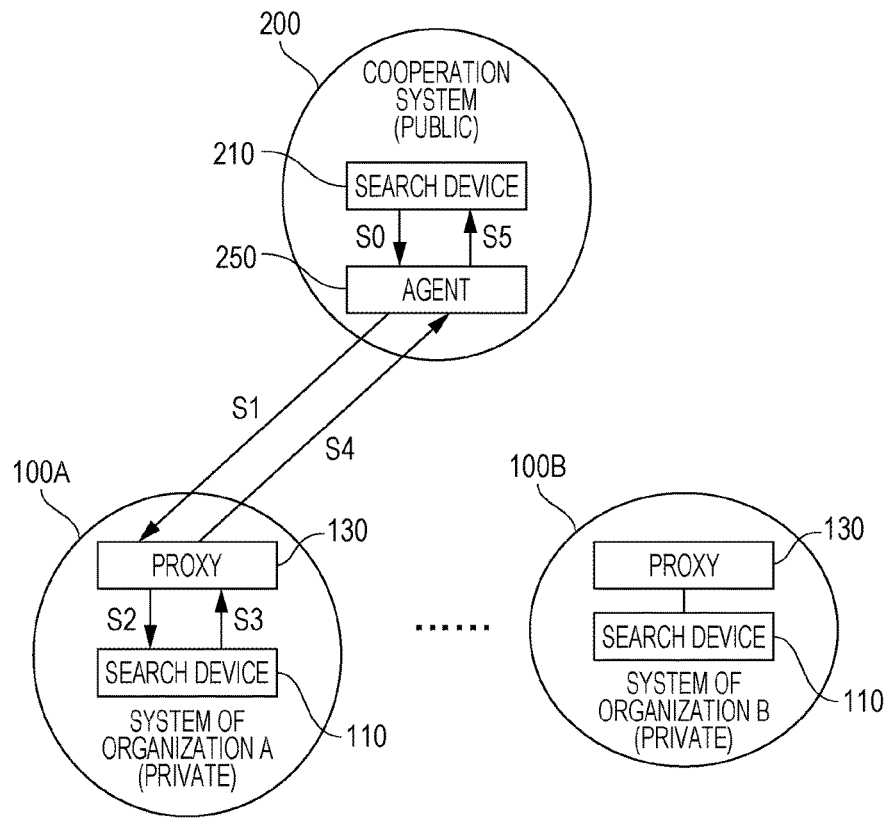
FIG. 15 illustrates an example of the flow of a search in the association search system according to the exemplary embodiment.

FIG. 12 illustrates an example of the content of data stored in the member information storage section 55. In the example, for each member that participates in the cooperation, the user ID (identification information) and the user name of the member in the cooperation system 200, identification information on the organization to which the member belongs (from which the member comes), and information on the user ID of the member in the organization to which the member belongs are registered in the member information storage section 55.

The external search processing section 53 obtains, for each organization that participates in the cooperation, the user IDs in the organization of the cooperation participant members who belong to the organization from the member information storage section 55. Then, the external search processing section 53 prepares a search request including the obtained user IDs of the members and the search condition acquired by the search condition acquiring section 51, and transmits the search request to the proxy 130 of the organization via a communication network such as the Internet. In addition, the external search processing section 53 receives responses to the search request from the proxies 130 of the organizations, and delivers the responses to the search result presenting section 57.

The search result presenting section 57 collects and organizes the responses to the search request from the proxies 130 to prepare a search result display screen, and provides the display screen to the member as the search requesting entity. The responses from each proxy 130 contain information on persons having a link on the graph to a data element that suits the search condition among the cooperation participant members of the organization to which the proxy 130 belongs. The search result presenting section 57 provides a search result screen including a list of information from such responses to the user as the search requesting entity.

On the search result screen presented by the search result presenting section 57, a list of "cooperation participant members that may possibly access a data element (e.g. a document) that matches the search condition" included in the responses from the systems 100 of the organizations is displayed. The user as the search requesting entity designates a cooperation participant member as the requested entity that the user desires to request to obtain a data element that matches the search condition from the list on the search result screen. In response to such designation, the obtainment request processing section 59 transmits an obtainment request for the data element to the proxy 130 of the organization to which the requested entity belongs. Each of the responses from the proxies 130 displayed in a list on the search result screen (i.e. "the cooperation participant members that may possibly access a data element (e.g. a document) that matches the search condition") includes a unique search result ID (which will be discussed in detail later) provided by the proxy 130 as the responding entity. Thus, the obtainment request processing section 59 sends an obtainment request including the search result ID corresponding to the response in which the user as the search requesting entity selected the obtainment requested entity for the data element to the proxy 130 as the responding entity.

Then, when a data element is provided from the requested entity to the cooperation system 200 by way of the proxy 130 in response to the obtainment request, the provision of the data element is displayed on the search result screen of the search result presenting section 57 via the obtainment request processing section 59. The user as the search requesting entity accesses the provided data element by way of the display.

Next, an example of the functional configuration of the proxy 130 of each organization will be described with reference to FIG. 13. In FIG. 13, the search device illustrated in FIG. 4 (indicated by numeral 110 in FIG. 13) is also illustrated.

In the proxy 130, the search request acquiring section 32 acquires a search request from the agent 250 of the cooperation system 200.

As discussed earlier, the search request from the agent 250 includes a search condition that specifies a data element desired to be retrieved, and the user ID of a member who participates in the cooperation from the organization. A search request acquiring section 32 delivers the search condition to the search processing section 20 of the search device 110, and causes the search processing section 20 to search a storage device 10 for a data element that meets the search condition. In the case where a data element that meets the search condition is not found in the storage device 10, the search processing section 20 responses to the proxy 130 accordingly. Such a response indicating that "nothing meets the search condition" is held by a search result holding section 34, and sent to the agent 250 by a search result responding section 36.

In the case where one or more data elements that meet the search condition are found, the search request acquiring section 32 determines the thus retrieved data element that meets the search condition as one base-point node, determines a node for a data element that represents the cooperation participant member included in the search request as the other base-point node, and instructs the search processing section 20 to investigate for a chain of links (i.e. a path formed from a chain of links) that connect between the two base-point nodes.

When the investigation instruction is received, the search processing section 20 obtains a chain of links related to data elements having a specific attribute (e.g. "(being a) person") that connect between the two designated base-point nodes through the procedure illustrated in FIGS. 6 and 7. Here, in the case where the user IDs of plural cooperation participant members are included in the search request from the agent 250, a chain of links that connect between a node that represents the member and a node for a data element that meets the search condition is obtained for each of the individual cooperation participant members. In the case where plural data elements that meet the search condition are retrieved, meanwhile, a chain of links that connect between a node for the data element and a node for the cooperation participant member is investigated for each of the data elements that meet the search condition.

In the case where no chain of links that connect between the cooperation participant member included in the search request and the data element that meets the search condition is found, the search processing section 20 responses to the proxy 130 accordingly. In response to the response, the search result responding section 36 replies to the agent 250 with a response indicating that "nothing meets the search condition".

If one or more chains of links between the cooperation participant member included in the search request and the data element that meets the search condition are retrieved, the one or more retrieved chains of links are sent from the search processing section 20 to the proxy 130 as the search result, and stored in the search result holding section 34. Here, the retrieved chains of links may be grouped for each cooperation participant member determined as one base-point node, and stored in correlation with a unique search result ID provided to each group.

An example of information on the search result held by the search result holding section 34 is illustrated in FIG. 14. In the example, the search result holding section 34 stores, in correlation with the search result ID, the user name of the cooperation participant member determined as one base-point node of the chain of links (in the drawing, indicated as "requested entity candidate" in the sense that the cooperation participant member may be the obtainment requested entity for the data element), identification information on the data element that meets the search condition determined as the other base-point node (in the illustrated example, "Doc1"), and a group of one or more chains of links that connect between the two base-point nodes. For example, data in a row with a search result ID "010001" correspond to a case where two chains of links that connect between the cooperation participant member "A-a" (in FIG. 3, indicated as "you") and the data element "Doc1" that meets the search condition as illustrated in FIG. 3. In the example of FIG. 14, besides, one chain of links with the data element "Doc1" is found for each of the cooperation participant members "A-b" and "A-f". A search result list such as that illustrated in FIG. 14 is stored in the search result holding section 34 for each search request received from the agent 250.

The search result responding section 36 specifies a cooperation participant member connected via a chain of links to the data element that meets the search condition from the information on the search result held by the search result holding section 34. Then, for example, the search result responding section 36 prepares a message indicating that the specified cooperation participant member may possibly obtain the data element, and sends to the agent 250 response information including the message and the search result ID (which has been correlated with the group of the chain of links of the cooperation participant member in the search result holding section 34). In the example of FIG. 14, a message indicating that the member may possibly obtain the data element is prepared for each of the cooperation participant members "A-a", "A-b", and "A-f", and each message is sent to the agent 250 as correlated with the corresponding search result ID "010001", "010002", and "010003".

In this way, the proxy 130 does not provide the retrieved chain of links themselves, but provides only information on the cooperation participant member that may possibly access the data element that meets the search condition, to the external agent 250.

The response information from the proxy 130 is merged by the agent 250 with responses to the same search request from the other proxies 130, and presented as the search result to the user as the search requesting entity. When the user as the search requesting entity selects an obtainment requested entity for the data element from the search result, an obtainment request including the search result ID corresponding to the selected obtainment requested entity arrives at the proxy 130 from the obtainment request processing section 59 of the agent 250. When the obtainment request is received, an obtainment request processing section 38 of the proxy 130 requests the search result holding section 34 for information on the search result corresponding to the search result ID included in the request. Then, the obtainment request processing section 38 notifies the cooperation participant member as the requested entity included in the search result of the obtainment request for the data element. The notification includes information (e.g. the user name) that specifies the requesting entity (the user as the search requesting entity), information (e.g. the document name) that specifies the data element to be obtained, and information on the chain of links that connect between the cooperation participant member as the notified entity (requested entity) and the data element. The member as the requested entity references such information to determine whether or not the data element being requested may be provided to the requesting entity. Then, in the case where it is determined that the data element may be provided, the member as the requested entity specifies a user (e.g. the person who "prepared" the data element) having an access right to the data element by tracing a link via "persons" with reference to the information on the chain of links, and requests the specified user to provide the data element. In the case where the data element is provided (e.g. transmitted as attached to an electronic mail, or an access right to the data element is provided to the member as the requested entity by setting the database 10) by the user in response to the request, the member as the requested entity sends the data element to the obtainment request processing section 38 of the proxy 130. The obtainment request processing section 38 sends the received data element to the obtainment request processing section 59 of the agent 250. The obtainment request processing section 59 provides the received data element to the user (search requesting entity) who requested obtainment.

Next, an example of the flow of the search and the obtainment of the data element will be described with reference to FIGS. 15 to 18.

First, the user as the search requesting entity who participates in the cooperation logs in to a search system 210 of the cooperation system 200. In response thereto, the search system 210 provides a search UI (user interface) screen for allowing input of a search condition and presenting a search result to a PC (personal computer) operated by the search requesting entity in the form of a web page, for example.

Figure 16:
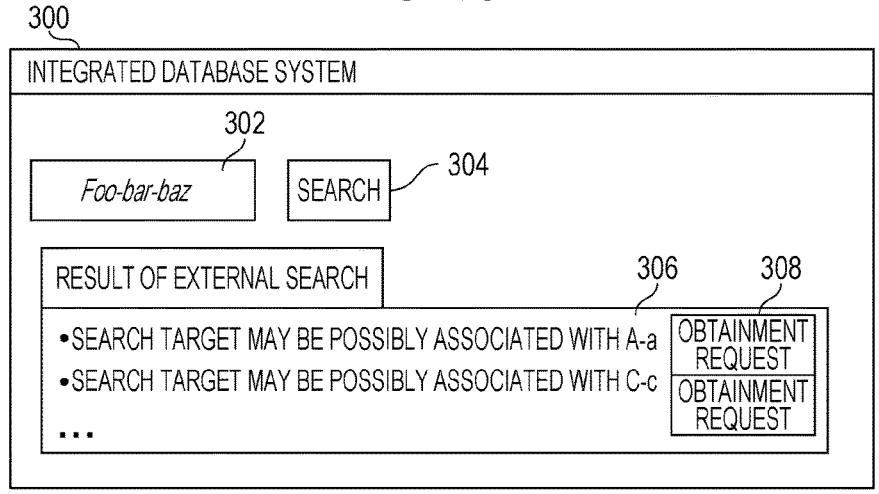
FIG. 16 illustrates an example of a UI screen that displays the search result that the agent provides to the search requesting entity.

FIG. 16 illustrates an example of a search UI screen 300. The search UI screen 300 includes a search condition input field 302, a search button 304, and an external search result display field 306 for display of a search result from an external database (in the example, the database 10 in the system 100 of each organization). In the example, the data element as the search target is a document file, and a character string that indicates (all or a part of) the name of the document desired to be retrieved is input to the search condition input field 302. However, this is merely exemplary. For example, any data element other than document files that may be provided to the user as the search requesting entity may be the target to be retrieved or provided. In addition, the search condition input field 302 may receive input of a combination of plural attributes of the data element as the search target.

On the search UI screen 300 at the time when the user as the search requesting entity has logged in to the search system 210, both the search condition input field 302 and the external search result display field 306 are blank. When the user as the search requesting entity inputs a search condition (e.g. a document name) to the search condition input field 302 and depresses the search button 304 by operating a pointing device or the like, the search condition is sent from the PC of the user to the search system 210 to start a search process. In the process, the search system 210 delivers the search condition to the agent 250, and requests the agent 250 to make an inquiry to the systems 100A, 100B, . . . of the external organizations (S0 of FIG. 15).

In response to the request, the agent 250 sends a search request to the systems 100 of the organizations (S1). The search request includes the user ID of a member who belongs to the destination organization, among the cooperation participant members, and the search condition.

The search request from the agent 250 is received by the proxy 130 in the system 100 of each organization. The proxy 130 causes the search system 110 to search for a data element that meets the search condition included in the search request. In addition, the proxy 130 causes the search system 110 to investigate for a chain of links that connect between a node for a data element that meets the search condition obtained as a result of the search and a node for a data element that represents a person corresponding to the user ID included in the search request (i.e. a cooperation participant member who belongs to the organization) (S2). In response thereto, the search system 110 executes the process procedure of FIGS. 6 and 7 to investigate for a chain of links that connect between the two nodes.

The search system 110 replies to the proxy 130 with the search result and the link chain investigation result (S3). The returned results may be information illustrated in FIG. 14, for example.

The proxy 130 stores information on the chain of links for each cooperation participant member obtained as a result of the search and the investigation returned from the search system 110 in the search result holding section 34 in correlation with the search result ID as illustrated in FIG. 14.

In addition, the proxy 130 generates response information from the search result and the investigation result, and replies to the agent 250 with the generated response information (S4). Here, the response information generated by the proxy 130 does not include detailed information related to the data element obtained through the search and the content of the chain of links themselves. The response information includes information, from the graph information held in the database 10 in the search system 110, that represents who, among the cooperation participant members who belong to the organization, is linked to the data element that meets the search condition via one or more links related to a specific attribute (e.g. "person"). In addition, the response information includes information that indicates which of the search result IDs stored in the search result holding section 34 illustrated in FIG. 14 each cooperation participant member corresponds to, and information that indicates the proxy 130 of which organization the response information comes from. In the case where a data element that meets the search condition is not found, or in the case where no chain of links that connects between the data element that meets the search condition and the cooperation participant member who belongs to the organization is found, the response information may indicate that "nothing that meets the search condition is found".

When the response information is received from the proxy 130 of the organizations, the agent 250 collects and organizes such pieces of response information, and displays the response information on the search UI screen 300 (S5). FIG. 16 illustrates an example of the screen at this time. That is, in the example of FIG. 16, a list of responses from the proxies 130 to the search condition input to the search condition input field 302 by the user as the search requesting entity is indicated in the external search result display field 306. In the example, a fact that the cooperation participant member A-a from the organization A and the cooperation participant member C-c from the organization C (not illustrated) are lined to the data element that matches the search condition through a chain of links is expressed by messages indicating that "possibly associated with A-a" and "possibly associated with C-c". An obtainment request button 308 is displayed on the right side of each message. Each obtainment request button 308 is associated with the content of the response information on which the corresponding message is based (the search result ID and information that specifies the proxy 130 as the responding entity).

The flow of the search process and the link chain investigation process has been described above. Next, the flow in which the user as the search requesting entity obtains the retrieved data element (e.g. a document file) utilizing the search result and the investigation result will be described.

The user as the search requesting entity sees a list of messages displayed in the external search result display field 306 (see FIG. 16) to decide which of the cooperation participant members indicated in the messages to request to obtain the data element, and depresses the obtainment request button 308 corresponding to the cooperation participant member decided as the obtainment requested entity using a pointing device or the like. In response to the operation, the agent 250 transmits obtainment request information including the search result ID corresponding to the obtainment request button 308 and information (such as the user name or the user ID) that specifies the user who made the obtainment request (that is, the search requesting entity) to the proxy 130 as the responding entity corresponding to the depressed obtainment request button 308.

When the obtainment request information is received, the proxy 130 acquires information (see FIG. 14) corresponding to the search result ID included in the obtainment request information from the search result holding section 34, and sends an obtainment request to the user as the "requested entity candidate" included in the acquired information. The obtainment request may be sent to the user as the requested entity by a method such as sending an electronic mail including the URL (Uniform Resource Locator) of a web page (see FIG. 17) for responding to the request and a message for requesting obtainment of a data element.

The obtainment request may be sent to two or more of the cooperation participant members displayed in the external search result display field 306.

Figure 17:
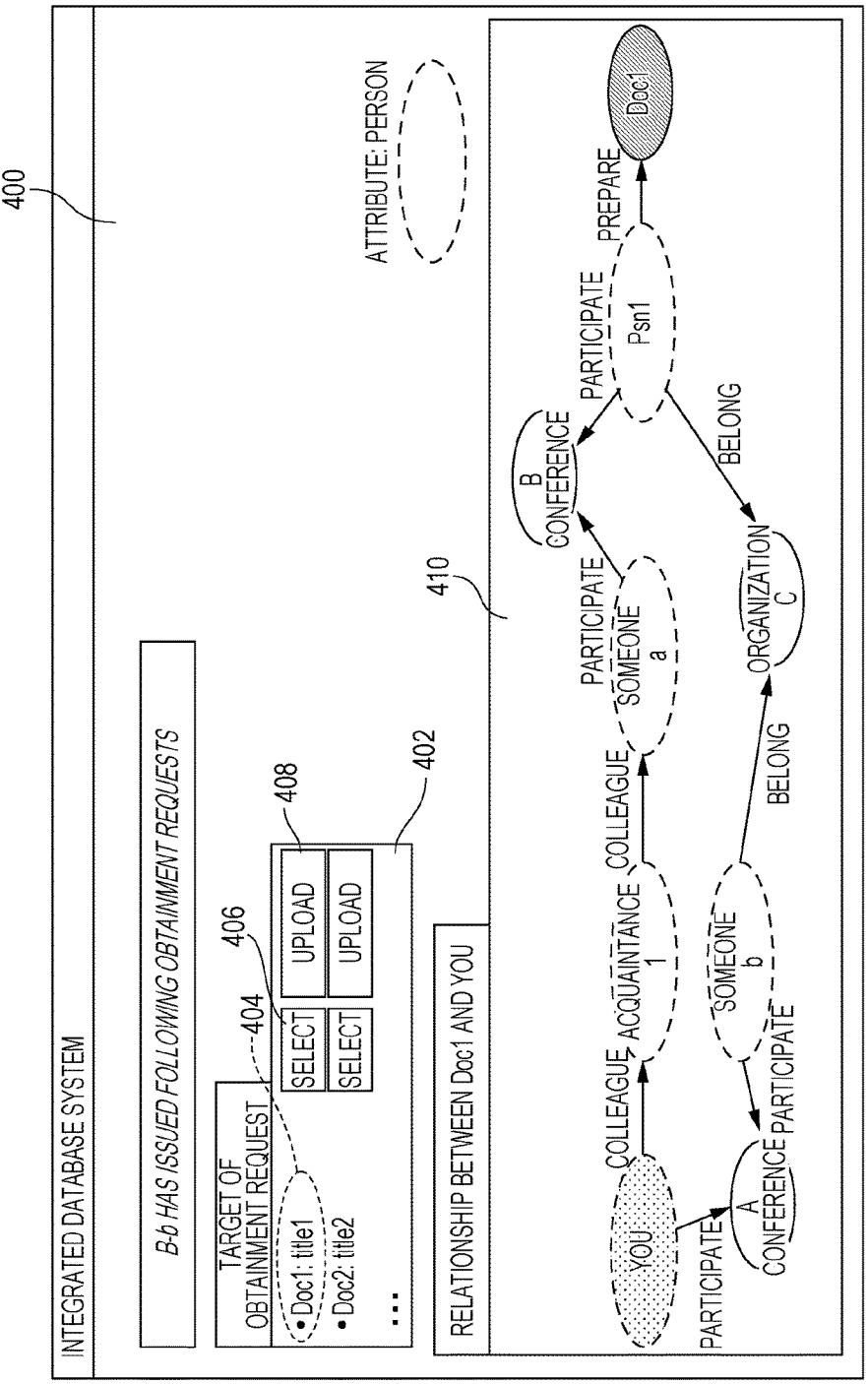
FIG. 17 illustrates an example of display of a web page for responding to an obtainment request that the proxy provides to an obtainment requested entity designated by the search requesting entity.

When the obtainment request is received, the user as the requested entity accesses the web page for responding to the request from his/her own PC. Here, it is assumed that the obtainment request is sent to the cooperation participant member "A-a" who belongs to the organization A. An example of a web page 400 for responding to the request for such a case is illustrated in FIG. 17. In the example, the web page 400 includes a message 401 indicating that an obtainment request for a data element is provided from the requesting entity (in the example, the cooperation participant member "B-b" who belongs to the organization B), and a list 402 of obtainment request targets. In the list 402, identification information on the data element as the obtainment request target and the title attribute (e.g. the name of the document file and the title attribute), a select button 406, and an upload button 408 are displayed. When the user as the requested entity depresses the select button 406 corresponding to a certain data element in the list, the relationship (a chain of links) on the graph between the data element and the user is displayed in a relationship display field 410. In the example of FIG. 17, the user corresponds to a node "you" at the left end, and is found to be related with the retrieved data element (the document "Doc1") via two paths.

The user "A-a" as the requested entity may see the display in the relationship display field 410 to determine whether he/she may directly obtain the targeted data element "Doc1" or may possibly obtain the data element via an acquaintance of his/hers in the organization A.

In the case where the data element may be directly obtained (e.g. in the case where there is a link indicating that the user has "prepared" the data element "Doc1"), the user "A-a" as the requested entity knows (or may confirm) the content of the data element, and thus may determine himself/herself whether or not the data element may be provided to the cooperation participant member "B-b" as the requesting entity.

In the case where it is necessary to obtain the data element via an acquaintance, meanwhile, the user may make an inquiry to the acquaintance as to whether or not the data element may be provided to the cooperation participant member "B-b", and obtain the data element from the acquaintance in the case where the acquaintance consents to the provision. The proxy 130 may mediate the inquiry.

In the case where the person (in the example of FIG. 17, "Psn1") who may provide the targeted data element "Doc1" is not a direct acquaintance of the user "A-a" as the requested entity, the user may make a similar inquiry to the person "Psn1" who may provide the data element through the influence of a direct acquaintance (e.g. "someone a") of the user on the chain of links indicated in the relationship display field 410 in an attempt to obtain the data element.

In the case where the user as the requested entity may obtain the targeted data element and determine that the data element may be provided to the requesting entity in this way, the user depresses the upload button 408 corresponding to the targeted data element on the web page 400 for responding to the request of FIG. 17. Consequently, a screen for selecting a target file to be uploaded is displayed, for example, and the user as the requested entity selects the data element which has been obtained to be uploaded from files in his/her own PC displayed on the screen. In response to the operation, the proxy 130 uploads the data element to the agent 250.

Figure 18:
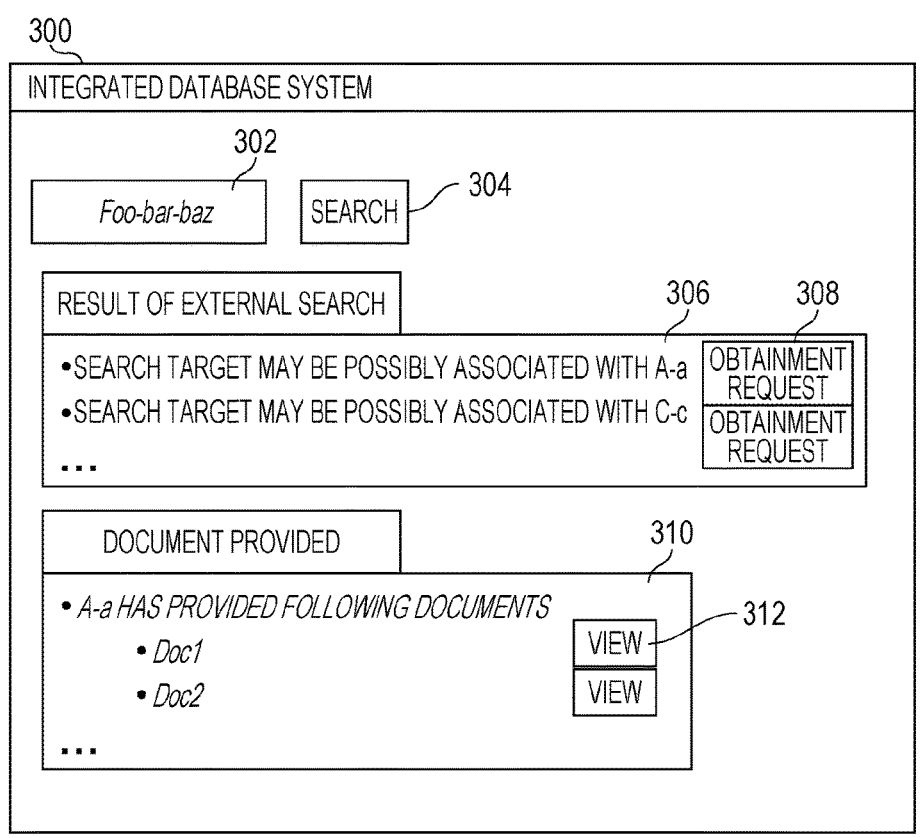
FIG. 18 illustrates an example of a UI screen that displays the obtainment request result that the agent provides to the search requesting entity.

The agent 250 saves the uploaded data element, and indicates that the data element for which an obtainment request was made has been provided on the search UI screen 300 for the user as the search requesting entity. For example, the agent 250 (search result presenting section 57) generates a search UI screen 300 including a provided document list 310 as illustrated in FIG. 18, and provides the search UI screen 300 to the PC of the user as the search requesting entity. In the provided document list 310, identification information (such as the document file name) on the data element and a view button 312 are displayed for each data element uploaded in response to the obtainment request. The view button 312 is linked to a file for the saved data element. The user as the search requesting entity chooses one of the data elements displayed in the provided document list 310, the content of which the user desires to view, and depresses the view button 312 corresponding to the chosen data element. Consequently, the file for the data element associated with the view button 312 is called up, and displayed on the screen.

An example of the flow of the process according to the exemplary embodiment has been described above. In the example described above, only the search result and the investigation result (external search result display field 308) from the systems 100 of the organizations are displayed on the search UI screen 300 provided by the cooperation system 200. However, this is merely exemplary. For example, the search system 210 in the system 200 may be caused to make a search using the same search condition, a chain of links between the data element found through the search and the user as the search requesting entity may be investigated, and the search result and the investigation result may be displayed in the search UI screen 300. The displayed content may be similar to that displayed in the relationship display field 410 of FIG. 17, for example.

In a modification, the agent 250 may rank individual response items included in the response information returned from each proxy 130 in response to the search request (i.e. information that indicates which of the cooperation participant members is likely to have access to the data element that meets the search condition, with a search result ID attached), sort the response items in the ascending order of the rank, and present the sort result on the search UI screen 300.

The ranking may be performed in accordance with the intimacy between the user as the search requesting entity and the cooperation participant member related to the individual search result ID included in the response information, for example. To this end, the agent 250 may hold a database for the intimacy among the cooperation participant members. In this case, the agent 250 obtains the intimacy between the cooperation participant member who is the user as the search requesting entity and the cooperation participant member corresponding to the search result ID for the response item indicated by the individual search result ID in the response information from each proxy 130, and provides a score that is higher as the obtained intimacy is higher to the response item. Then, the response items are sorted in the descending order of the score, and the sort result is displayed in the external search result display field 308.

The database for the intimacy may be constructed by each cooperation participant member by registering his/her intimacy with other cooperation participant members, for example. In another example, the frequency of communication (e.g. exchange of electronic mails and posts on an electronic bulletin board and responses to the posts) among the cooperation participant members via the cooperation system 200 may be summarized, and the intimacy may be obtained in accordance with the frequency to be registered in the database.

The score for ranking the response items may be obtained in accordance with the number of hops in the link chain path in the same manner of thinking as the sorting performed by the sorting section 22 discussed above. That is, as the number of hops in a chain of links obtained through an investigation is smaller, a higher score is given to a response item corresponding to the chain of links. This is because it is considered that as the number of hops in a chain of links is smaller, it is easier for the cooperation participant member at one end point of the chain of links to access the data element that meets the search condition at the other end point. In order to rank the response items on the basis of the number of hops in the chain of links, for example, the proxy 130 may score the response items in accordance with the number of hops, and provide such scores to the agent 250. In this scheme, for example, the proxy 130 calculates the number of hops in the chain of links corresponding to the individual response item (search result ID), and determines the score corresponding to the number of hops in accordance with a relational expression determined in advance such that the score is higher as the number of hops is smaller. Then, the score is included in the response information in correlation with the search result ID, and provided to the agent 250. In the case where plural chains of links are included in a response item corresponding to one search result ID (e.g. the response item with a search result ID of "010001" in FIG. 14), the score may be calculated using one of the plural chains of links with the smallest number of hops.

The response items may be ranked on the basis of a total score obtained by totaling the score based on the intimacy and the score based on the number of hops discussed above.

The search devices 110 and 210, the proxy 130, and the agent 250 described above may each be implemented by causing a general-purpose computer to execute a program that represents processes of various functional modules discussed above, for example. Here, the computer has a circuit configuration in which, for example, pieces of hardware such as a microprocessor such as a CPU, a memory (primary storage) such as a random-access memory (RAM) and a read-only memory (ROM), an HDD (hard disk drive) controller that controls an HDD, various I/O (input/output) interfaces, and network interfaces that control connection with a network such as a local area network are connected via a bus, for example. A disk drive that reads data from and/or writes data into a portable disc recording medium such as a CD and a DVD, a memory reader/writer that reads data from and/or writes data into a portable non-volatile recording medium according to various standards such as a flash memory, etc. may be connected to the bus by way of the I/O interfaces, for example. A program that describes the content of processes performed by the functional modules described above is stored in a stationary storage device such as the hard disk drive to be installed on the computer by way of a recording medium such as a CD and a DVD or by way of communication means such as a network. The program stored in the stationary storage device is read by the RAM and executed by the microprocessor such as the CPU to implement the group of functional modules described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An association search system comprising:
   a plurality of databases with different collections of users having an access right to one or more of the plurality of databases; and
   a search handling device,
   wherein the search handling device comprises:
   a processor configured to execute:
      a registered user storage section that stores access right information that indicates which of the plurality of databases each registered user has an access right to, the registered user having an access right to at least one of the plurality of databases and being registered in the search handling device,
      a search request transmitting section that transmits a search request to each of the plurality of databases in response to input of a search condition being received from a user as a search requesting entity, the search request including identification information on the registered user having an access right to the database and the search condition, and
      a search result providing section that provides the user as the search requesting entity with information on the registered user having a link that is traceable via one or more chains of links to a data element that suits the search condition on a basis of response information from each of the plurality of databases to the search request, and
   the plurality of databases each includes
      a graph storage section that stores information on a graph in which data elements are defined as nodes and relationships among the data elements are defined as links, the data elements including a user element that represents a user having an access right to the database,
      a search request acquiring section that acquires the search request from the search handling device,
      a data search section that searches the graph storage section for a data element that suits the search condition in the acquired search request,
      a chain investigating section that investigates the graph storage section for a chain of the links that connect between a node for a data element that suits the search condition retrieved by the data search section and a node for a user element that represents the registered user included in the search request, and
      a responding section that specifies, among the registered users having an access right to the database, the registered user linked to the node for the data element that suits the search condition through the chain of links on a basis of a result of the investigation performed by the chain investigating section, and responds to the search handling device with response information that represents the specified registered user.

2. The association search system according to claim 1, wherein the chain investigating section
   determines a node for a user element that represents the registered user included in the search request, or a node for a data element as a result of the search retrieved by the data search section in accordance with the search condition included in the search request, as a base-point node, and obtains the chain of links that connect between a node for a user element that represents the registered user included in the search request and a node for a data element as the result of the search retrieved by the data search section in accordance with the search condition included in the search request by repeatedly performing an investigation process for investigating the graph storage section for an adjacent node, among adjacent nodes that are connected to an in-focus node via one link, that meets an investigation condition that at least one of the in-focus node and the adjacent node has an attribute determined in advance, wherein the investigation process is repeatedly performed by investigating for an adjacent node that meets the investigation condition using the base-point node as the in-focus node and investigating for an adjacent node that meets the investigation condition using the adjacent node that meets the investigation condition obtained through the previous search as a next in-focus node.

3. The association search system according to claim 1, wherein the search handling device further includes a score calculating section that calculates, for the response information from each of the plurality of databases to the search request, a search score that is higher as a number of hops in the chain of links that connects between a node for the registered user represented in the response information and a node for a data element that suits the search condition is smaller, and the search result providing section provides information on the registered users having a link that is traceable via one or more chains of links to a data element that suits the search condition as ranked on a basis of the search score calculated by the score calculating section.

4. The association search system according to claim 1, wherein the search handling device further includes an intimacy storage section that stores information on a level of intimacy between the user as the search requesting entity and each of the registered users, and a score calculating section that calculates, for response information from each of the plurality of databases to the search request, a search score that is higher as the level of intimacy between the registered user represented in the response information and the user as the search requesting entity is higher, and the search result providing section provides information on the registered users having a link that is traceable via one or more chains of links to a data element that suits the search condition as ranked on a basis of the search score calculated by the score calculating section.

5. The association search system according to claim 1, wherein the search result providing section displays a chain of links from the user to the data element including the registered user having access to the data element as an intermediary in the chain of links.

6. The association search system according to claim 5, wherein the chain of links indicate a relationship between adjacent node in the chain from the user to the data element.

7. The association search system according to claim 5, wherein the chain of links indicate a type relationship between adjacent node in the chain from the user to the data element.

8. The association search system according to claim 5, wherein the search handling device allows the user to access to the data element in response to a selection of the chain of links, among a plurality of chains of links.

* * * * *